United States Patent
Nobutoki et al.

(10) Patent No.: US 10,518,351 B2
(45) Date of Patent: Dec. 31, 2019

(54) ARC WELDING METHOD FOR ZN PLATED STEEL SHEET AND ARC WELDED JOINT

(71) Applicant: NIPPON STEEL NISSHIN CO., LTD., Chiyoda-ku, Tokyo (JP)

(72) Inventors: Tomokazu Nobutoki, Tokyo (JP); Kazuaki Hosomi, Tokyo (JP)

(73) Assignee: NIPPON STEEL NISSHIN CO., LTD., Tokyo (JP)

( * ) Notice: Subject to any disclaimer, the term of this patent is extended or adjusted under 35 U.S.C. 154(b) by 78 days.

(21) Appl. No.: 15/529,233

(22) PCT Filed: Jul. 31, 2015

(86) PCT No.: PCT/JP2015/071744
§ 371 (c)(1),
(2) Date: May 24, 2017

(87) PCT Pub. No.: WO2016/084423
PCT Pub. Date: Jun. 2, 2016

(65) Prior Publication Data
US 2017/0326672 A1   Nov. 16, 2017

(30) Foreign Application Priority Data

Nov. 27, 2014 (JP) .................. 2014-240402

(51) Int. Cl.
*B23K 9/00* (2006.01)
*B23K 9/02* (2006.01)
*B23K 9/23* (2006.01)
*C23C 2/06* (2006.01)
*C22C 18/04* (2006.01)
(Continued)

(52) U.S. Cl.
CPC .................. *B23K 9/23* (2013.01); *B23K 9/02* (2013.01); *B23K 9/032* (2013.01); *B23K 9/0953* (2013.01); *B23K 9/0956* (2013.01); *C22C 18/04* (2013.01); *C23C 2/06* (2013.01); *F16B 5/08* (2013.01);
(Continued)

(58) Field of Classification Search
CPC .. B23K 2101/18; B23K 2103/04; B23K 9/02; B23K 9/032; B23K 9/0953; B23K 9/0956; B23K 9/23; C22C 18/04; C23C 2/06; F16B 5/08
USPC ............... 219/101, 102, 136, 137 R, 137 PS, 219/137 WM
See application file for complete search history.

(56) References Cited

U.S. PATENT DOCUMENTS

| 4,445,022 A * | 4/1984 | Mori .................. B23K 9/0953 219/125.1 |
| 6,177,650 B1 * | 1/2001 | Watanabe ............ B23K 9/0953 219/125.1 |
| 2015/0136741 A1 | 5/2015 | Hosomi et al. |

FOREIGN PATENT DOCUMENTS

| EP | 2474381 A1 | 7/2012 |
| JP | S55156668 A | 12/1980 |

(Continued)

OTHER PUBLICATIONS

English translation for JP2013-198935, Oct. 3, 2013 (Year: 2013).*
(Continued)

*Primary Examiner* — Sang Y Paik
(74) *Attorney, Agent, or Firm* — Cantor Colburn LLP (57) ABSTRACT

Provided are: an arc welding method that suppresses occurrences of blow holes in initial parts and final parts in a Zn plated steel sheet and reduces the occupancy ratio for blow holes in the welded part as a whole; and a welded joint.

4 Claims, 4 Drawing Sheets

(51) Int. Cl.
*B23K 9/032* (2006.01)
*B23K 9/095* (2006.01)
*F16B 5/08* (2006.01)
*B23K 103/04* (2006.01)
*B23K 101/18* (2006.01)

(52) U.S. Cl.
CPC ...... *B23K 2101/18* (2018.08); *B23K 2103/04* (2018.08)

(56) References Cited

FOREIGN PATENT DOCUMENTS

| | | |
|---|---|---|
| JP | S62179869 A | 8/1987 |
| JP | H05212405 A | 8/1993 |
| JP | H06039554 A | 2/1994 |
| JP | H07051859 A | 2/1995 |
| JP | H07246465 A | 9/1995 |
| JP | H10258367 A | 9/1998 |
| JP | 2011131243 A | 7/2011 |
| JP | 4776951 B2 | 9/2011 |
| JP | 2012081514 A | 4/2012 |
| JP | 2013198935 A | 10/2013 |
| JP | 2014113641 A | 6/2014 |
| JP | 2014131809 A | 7/2014 |
| JP | 2014133259 A | 7/2014 |
| WO | 2014156115 A1 | 10/2014 |

OTHER PUBLICATIONS

International Search Report corresponding to International Application No. PCT/JP2015/071744; dated Oct. 13, 2015; with English translation.
Extended European Search Report corresponding to Application No. 17210051.3-1016; dated May 7, 2018.
Written Opinion issued to corresponding SG Patent Application No. 10201709716P; dated Jul. 4, 2018.
Extended European Search Report corresponding to Application No. 15862715.8/1016/3225346 PCT/JP2015071744; dated Oct. 17, 2018.
IN Office Action corresponding to Application No. 201717018473; dated Oct. 15, 2019.

* cited by examiner

FIG. 3A
BLOWHOLE OCCUPANCY OVER FULL LENGTH OF WELDING SECTION

FIG. 3B
BLOWHOLE OCCUPANCY FOR EACH WELDING AREA
<MEAN VALUE OF N = 3>

FIG. 4

ARC WELDING METHOD FOR ZN PLATED STEEL SHEET AND ARC WELDED JOINT

This is the U.S. national stage of application No. PCT/JP2015/071744, filed Jul. 31, 2015. Priority under 35 U.S.C. § 119(a) and 35 U.S.C. § 365(b) is claimed from Japanese Application No. 2014-240402, filed Nov. 27, 2014, the disclosure of which is also incorporated herein by reference.

TECHNICAL FIELD

The present invention relates to arc welding of Zn (zinc)-based plated steel sheets. In particular, the present invention relates to an arc welding method capable of reducing development of blowholes and the like to form a good welded joint.

BACKGROUND ART

A Zn-based plated steel sheet in which a steel sheet is plated with Zn or a Zn alloy has excellent corrosion resistance, strength, workability, and the like, and also shows an aesthetically pleasing appearance. For these reasons, it is widely used for automobiles, housing, home appliances, and the like. In order to perform arc welding of Zn-based plated steel sheets, heat is applied while a welding wire is supplied between the Zn-based plated steel sheets which are materials to be welded. Thereby, they are joined. Consequently, the Zn-based plated steel sheets as materials to be welded are exposed to heat generated by electric arc during arc welding of them. Then, Zn vapor may be generated during welding because the boiling point of Zn (906° C.) in the plating layers is lower than that of Fe in the steel sheets. The vapor may enter into a welding section when it is in a molten state, and may be trapped after it is solidified to create cavities (blowholes) inside the welding section. Further, the blowholes may form openings (pits) when they grow to reach the surface of the welding section. Particularly in the case of lap fillet arc welding, Zn vapor generated from the overlaid portion of Zn-based plated steel sheets may tend to enter into a melted section, and ascend toward the surface of the melted section to form blowholes and pits inside the welding section. (Hereafter, the term "blowhole" encompasses the term "pit".)

Various methods have been proposed to reduce development of blowholes. Provision of a space (gap) between welding members is effective. For example, Patent Document 1 proposes a method in which a gap of about 0.5 mm is provided between overlaid members to be welded, thereby allowing a generated gas to escape to the opposite side of a welding section (see the left lower column on page 1). Further, Patent Document 2 proposes a method as a conventional example in which protruded portions are provided on at least either one of two base materials to form a gap around a welding section, thereby allowing a vaporized low-boiling point material to diffuse and escape to the outside through the gap (see Paragraph 0005). These methods are effective to reduce development of blowholes. Nonetheless, it is difficult to sufficiently reduce development of blowholes throughout the entire length of a weld bead. In particular, the cooling rate of a weld metal is larger in a region formed after the start of welding (starting end portion) and a region formed before the end of welding (terminal end portion) as compared with a central region formed between them, and thus development of blowholes is difficult to be reduced. In view of the above, improvements have been demanded.

Patent Document 1: Japanese Unexamined Patent Application, Publication No. H07-246465
Patent Document 2: Japanese Unexamined Patent Application, Publication No. S62-179869

DISCLOSURE OF THE INVENTION

Problems to be Solved by the Invention

When blowholes are developed during arc welding of Zn-based plated steel sheets, and the blowhole occupancy over the entire welding section increases, the joining area in the welding section is reduced, significantly affecting the joining strength of the welding section. Further, formation of pits on the outer surface of the welding section will impair the appearance of the welding section.

Accordingly, an object of the present invention is to provide arc welding of Zn-based plated steel sheets in which the blowhole occupancy over the entire welding section is reduced by reducing development of blowholes in a starting end portion and a terminal end portion, the starting end portion being a region formed after the start of welding, and the terminal end portion being a region formed before the end of welding.

Means for Solving the Problems

After conducting extensive studies to achieve the above object, the present inventors found that discharge of a gas from a weld metal at a starting end portion and a terminal end portion of a welding section can be facilitated, and development of blowholes and pits can be reduced by providing an inter-sheet gap in a predetermined range; using welding conditions such as a welding speed, a welding heat input, a welding current, and a welding voltage in the starting end portion and in the terminal end portion, the welding conditions being different from those used in the central portion; and stopping electric arc at the terminal end portion when performing arc welding of Zn-based plated steel sheets. Then the present invention has been completed. Specifically, the present invention can provide the following.

(1) The present invention can provide a method of arc-welding Zn-based plated steel sheets, in which an inter-sheet gap in a range of 0.2 to 1.5 mm is provided, and welding is performed by moving a welding means along an overlaid portion of the steel sheets to be welded and joined, the method including: a first step of moving the welding means at a first welding speed from a welding start point, and applying a first welding heat input to perform welding; a second step of, after the first step, moving the welding means at a second welding speed, and applying a second welding heat input to perform welding; and a third step of, after the second step, stopping the movement of the welding means, and performing welding for 0.1 to 2 seconds at a position where the welding means is stopped, in which the first step includes a welding section welded under conditions where the first welding speed is smaller than the second welding speed, and the first welding heat input is larger than the second welding heat input, and the third step includes performing welding at a welding current and a welding voltage lower than those used in the second step.

(2) The present invention can provide the method of arc-welding Zn-based plated steel sheets according to (1), in which a starting end portion corresponding to a welding section after the first step is a region covering 10 to 40% of the entirety of a welding length, and a terminal end portion corresponding to a welding section after the third step is a region covering 10 to 20% of the entirety of the welding length.

(3) The present invention can provide the method of arc-welding Zn-based plated steel sheets according to (1) or (2), in which the first step includes starting welding at one end of the overlaid portion, and performing welding toward the other end, the welding heat input in the first step being more than 1.2 times of the welding heat input in the second step.

(4) The present invention can provide the method of arc-welding Zn-based plated steel sheets according to (1) or (2), in which the first step includes performing welding at the welding start point located inwardly from the one end of the overlaid portion toward the end, and then turned around to perform welding from the end toward the other end, the welding toward the one end being performed at a welding speed smaller than the welding speed in the second step and with a welding heat input more than 1.2 times of the second welding heat input, and the welding toward the other end being performed at the same welding speed as the second welding speed.

(5) The present invention can provide the method of arc-welding Zn-based plated steel sheets according to any one of (1) to (4), in which a blowhole occupancy over the entirety of the welding length is less than 30%.

(6) The present invention can provide the method of arc-welding Zn-based plated steel sheets according to any one of (1) to (5), in which the Zn-based plated steel sheets each have a hot-dipped layer consisting of, by mass %, Al: 4.0 to 22.0%, Mg: 0.05 to 10.0%, Ti: 0 to 0.10%, B: 0 to 0.05%, Si: 0 to 2.0%, Fe: 0 to 2.5%, and the remainder being Zn and unavoidable impurities.

(7) The present invention can provide the arc welding method according to any one of (1) to (6), in which the Zn-based plated steel sheets each have a plating deposition amount per side of 20 to 250 $g/m^2$, and a sheet thickness of 1.6 to 6.0 mm.

(8) The present invention can provide an arc welded joint formed by the arc welding method according to any one of (1) to (7), in which the blowhole occupancy over the entirety of the welding length is less than 30%.

Effects of the Invention

According to the present invention, development of blowholes and pits in the starting end portion and the terminal end portion can be decreased to reduce the blowhole occupancy of the entire welding section when arc welding is performed with an inter-sheet gap provided between Zn-based plated steel sheets. This can prevent a decrease in the welding strength, contributing to improved safety and reliability of a welding section. Further, a welding section with good appearance can be obtained.

BRIEF DESCRIPTION OF THE DRAWINGS

FIG. 1 shows a schematic view of a T-shaped test piece used in Example.

PREFERRED MODE FOR CARRYING OUT THE INVENTION

Below, embodiments of the present invention will be described. The present invention shall not be limited to these descriptions.

(Inter-Sheet Gap)

In the method of arc-welding Zn-based plated steel sheets according to the present invention, the inter-sheet gap, which corresponds to a space between overlaid steel sheets, is preferably in the range of 0.2 mm or more and 1.5 mm or less.

In the arc welding of Zn-based plated steel sheets, a gas generated from Zn-based plating layers on the surfaces of the steel sheets due to a welding heat input as described above is responsible for development of blowholes in a welding section. Therefore, it is effective to provide a gap through which this generated gas is allowed to escape. For example, the lap fillet welding method includes overlaying two steel sheets so that an end of one steel sheet is laid over a surface of the other steel sheet, and performing fillet arc welding. Multiple protrusions are provided along an edge of the one steel sheet, and that steel sheet is allowed to abut on the surface of the other steel sheet through the protrusions to form a gap sized correspondingly to the height of the protrusions. When arc welding is performed while maintaining the above configuration, a generated gas is discharged from the side opposite to a weld metal through the gap, decreasing the ratio of a gas entering into the weld metal. This can reduce development of blowholes. In the present invention, the gap between steel sheets described above is called an "inter-sheet gap".

An inter-sheet gap of less than 0.2 mm is too small as a space for discharging a generated gas within a time frame of welding, resulting in insufficient reduction of blowhole development. When the gap is more than 1.5 mm, the proportion of a weld bead in the front side is decreased as the proportion of a back-side weld bead increases, the back-side weld bead being formed when a portion of the weld bead is outflowed into the back side through the gap. This is not preferred in view of the joining strength. Therefore, in the present invention, the gap is preferably 0.2 to 1.5 mm. The gap is more preferably 0.5 to 1.2 mm, even more preferably 0.7 to 1.0 mm.

(Welding Conditions)

The arc welding method according to the present invention, in which a welding means is moved along an overlaid portion of the steel sheets to be welded and joined, the method including: (i) a first step of moving the welding means at a first welding speed from a welding start point, and applying a first welding heat input to perform welding; (ii) a second step of, after the first step, moving the welding means at a second welding speed, and applying a second welding heat input to perform welding; and (iii) a third step of, after the second step, stopping the welding means, and performing welding for 0.1 to 2 seconds at a position where the welding means is stopped. Further, the first step includes a welding section welded under conditions where the first welding speed is smaller than the second welding speed, and the first welding heat input is larger than the second welding heat input, and the third step includes performing welding at a welding current and a welding voltage lower than those used in the second step.

The overlaid portion of the steel sheets in the arc welding method according to the present invention is subjected to the first step, the second step, and the third step in this order along a welding line (hereinafter, referred to as "the first step", "the second step" and "the third step") to form a welding section. With regard to regions of the above welding section, hereafter as used herein, a region of the welding section obtained after the first step refers to a "starting end portion", and a region of the welding section obtained after the third step refers to a "terminal end portion". Further, a region of the welding section sandwiched between the above starting end portion and the above terminating end refers to a "central portion". As understood from the welding process, the above terminal end portion corresponds to a region formed as a welding section by performing welding according to the third step after performing welding according to the second step. Each of these regions can be identified by their welding lengths. As shown schematically in FIG. 2, the overlaid portion where welding members 1 and 2 are welded can be divided into a starting end portion 5, a central portion 6, and a terminal end portion 7 located between the welding start point and the welding end point.

When welding is performed under the same conditions throughout the entire welding length, the temperature of the welding members immediately after the start of welding is still on the increase in the starting end portion, and heat supply is ended in the terminal end portion. In either case, a melted weld metal is more easily solidified as compared with that in the central portion. As described above, the cooling speed of a weld metal is fast in the starting end portion and the terminal end portion, and thus a melted metal solidifies before Zn vapor is discharged, resulting in increased development of blowholes and pits. Therefore, in the first step of forming the starting end portion after the start of welding, the first welding speed is decreased as compared with the speed in the subsequent second step to increase the first welding heat input. This is effective for slowing down solidification to reduce development of blowholes. Further, a welding section in which welding is performed at the first welding speed with the first welding heat input is preferably included, the first welding speed being smaller than the second welding speed and less than the second welding speed, and the first welding heat input being larger than the second welding heat input. The welding heat input is computed by the following formula.

Welding heat input [J/cm]=(welding current [A]×
voltage [V]×60)/welding speed [cm/min]

A time for the weld metal to solidify may be increased by increasing the welding heat input, and thus a gas generated during welding can be discharged from the melted metal to reduce the amount of the gas remaining in the melted portion, and thus reduce development of blowholes and pits. According to the present invention, a portion where welding is performed at the first welding speed, the first welding speed being less than the second welding speed, is required for the first step. However, an excessively slow first welding speed is not preferred in view of working efficiency. The first welding speed is preferably 0.2 to 0.35 m/min, more preferably 0.2 to 0.3 m/min. Further, the first welding heat input in the first step is preferably more than 1.2 times of the second welding heat input in the second step. It is more preferably, more than 1.3 times, but preferably less than 2.0 times. This is because an excessive gas may be generated when it is too large. For example, the first welding heat input may be 6350 to 9000 J/cm.

According to the present invention, welding is performed at the second welding speed in the second step, the second welding speed being larger than the first welding speed. Considering the length of a weld bead and working efficiency, it is preferably 0.35 to 0.50 m/min. Further, welding is performed at the second welding heat input, the second welding heat being smaller than the first welding heat input. For example, the second welding heat input may be 4220 to 6030 J/cm.

In the first and second steps, welding conditions such as the welding current and the welding voltage can suitably be selected depending on welding members, plating layers and materials thereof, product shapes, and the like. For example, the welding current may be 140 to 180 A, and the welding voltage may be 20 to 24 V.

Further, according to the present invention, the third step preferably includes stopping the welding means and performing welding for 0.1 to 2 seconds at a position where the welding means is stopped under welding conditions where the welding current and the welding voltage are lower than those in the second step. The welding current may be 90 to 120 A, and the welding voltage may be 15 to 18 V. In the third step, welding is continued without moving the welding means. This can slow down solidification of the weld metal as compared with a case where the welding means is moved, securing a time to allow Zn vapor to be discharged. Therefore, this is effective for reducing blowholes. When the welding time in the third step is too short, a sufficient effect may not be obtained. When the weld time is longer, weld beads may be formed more than required. This is not preferred in view of working efficiency. Therefore, the weld time is preferably 0.1 to 2 seconds. As used herein, the welding according to the third step may be referred to as the "crater treatment".

According to the present invention, the starting end portion, which corresponds to a welding section obtained after the first step, is preferably a region which accounts for 10 to 40% of the entire welding length, and the terminal end portion, which corresponds to a welding section obtained after the third step, is preferably a region which accounts for 10 to 20% of the entire welding length. When the starting end portion and the terminal end portion account for less than 10%, less regions can contribute to reduction of blowholes, resulting insufficient reduction of blowholes over the entire welding length. When the starting end portion accounts for more than 40%, a time required for welding operation is long. This is not preferred in view of working efficiency. When the terminal end portion accounts for more than 20%, weld beads are formed more than required. This is not preferred also in view of working efficiency. In particular, the welding length of the terminal end portion is preferably such that it is formed in the range of less than 10 mm from the terminal end. Once the starting end portion of a predetermined length is formed in the first step, welding conditions may be changed to start the second step. Further, the movement of the welding means is stopped after the second step, and welding conditions is changed to start the third step. Welding may be ended once the terminal end portion of a predetermined length is formed.

Figure 2A:
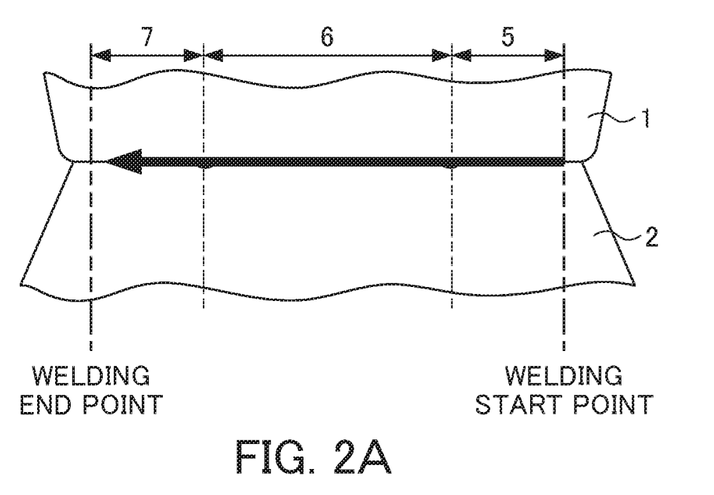
FIG. 2 schematically shows a welding area.

According to the present invention, a welding process may be used in which welding is started at one end of an overlaid portion, and welding is then allowed to move toward the other end in one direction as shown in FIG. 2(a). This is effective for reducing blowholes because a time for a weld metal to solidify is increased due to an increased welding heat input. Therefore, the welding heat input in the first step is preferably more than 1.2 times of the welding heat input in the second step.

Figure 2B:
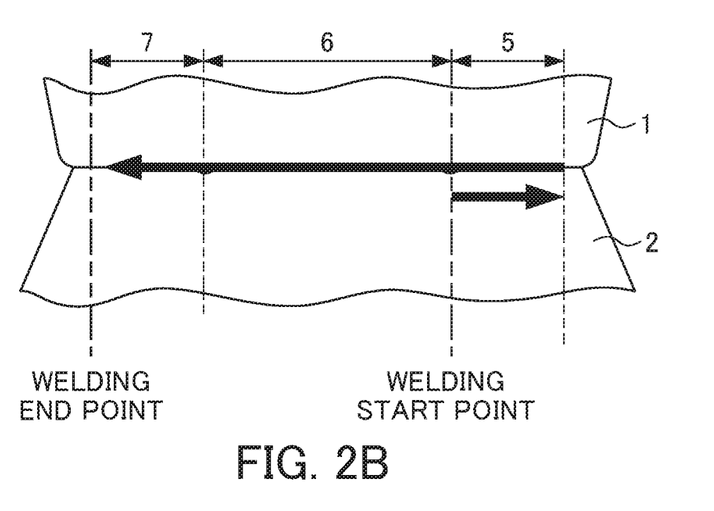

Further, in the present invention, the welding start point may be located at a position inwardly away from one end of the overlaid portion, as shown in FIG. 2(b). In that case, welding is performed by moving a welding means from the welding start point toward the end, and then the welding means is turned around to perform welding from the end toward the other end (hereinafter, such a welding process may be referred to as the "reverse welding process"). The welding toward the one end is preferably performed at the welding speed less than that in the second step with the welding heat input more than 1.2 times of the second welding heat input. The welding toward the other end, after which the second step is performed, may be performed under conditions of the same welding speed and the welding heat input as the second step.

(Blowhole Occupancy)

According to the present invention, development of blowholes and pits in a welding section can be reduced. The development can be evaluated using the blowhole occupancy (%) computed by the following formula as a measure for the development. It is noted that the length of a pit is included in the length of a blowhole when computing the blowhole occupancy (%).

Blowhole occupancy (%)=(Total length of blowholes)/(Length of weld bead)×100

The above blowhole occupancy is preferably less than 30% in each region of the starting end portion, the central portion, or the terminal end portion. It is more preferably less than 15%, and even more preferably less than 10%. Similarly, the blowhole occupancy over the entire welding length is also preferably less than 30%, more preferably less than 15%, less than 10%, and even more preferably less than 8%. A smaller blowhole occupancy can contribute more to improved welding strength and prevention of impaired appearance.

(Zn-Based Plated Steel Sheet)

In the present invention, there is no particular limitation for the plating composition of a Zn-based plated steel sheet, but Zn—Fe, Zn—Al, Zn—Al—Mg, and Zn—Al—Mg—Si based materials may be used. Preferred is a Zn-based plated steel sheet having a hot-dipped layer consisting of, by mass %, Al: 4.0 to 22.0%, Mg: 0.05 to 10.0%, Ti: 0 to 0.10%, B: 0 to 0.05%, Si: 0 to 2.0%, Fe: 0 to 2.5%, and the remainder being Zn and unavoidable impurities.

Al is effective for improving corrosion resistance of a plated steel sheet, and is an element which can reduce formation of Mg oxide-based dross in a plating bath. These effects may not be sufficiently obtained when the content is less than 4.0%. On the other hand, when the content of Al is increased, a fragile Fe—Al alloy layer tends to grow on a base material of a plating layer. This may be a factor of causing decreased plating adhesiveness. Therefore, the content of Al is preferably 4.0 to 22.0%.

Mg can show an effect for uniformly creating a corrosion product on the surface of a plating layer to significantly enhance corrosion resistance of a plated steel sheet. This effect may not be sufficiently obtained when the content is less than 0.05%. On the other hand, when the content of Mg in a plating bath is increased, formation of Mg oxide-based dross tends to be promoted. This may be a factor of causing a decreased quality of a plating layer. Therefore, the content of Mg is preferably 0.05 to 10.0%.

Advantageously, inclusion of Ti and B in a hot-dipping bath can increase the degree of freedom of manufacturing conditions upon hot-dipping. For this reason, one or two kinds of Ti and B may be added, as necessary. The added amounts of 0.0005% or more for Ti, and 0.0001% or more for B are effective. However, when the contents of Ti and B in a plating layer are too large, the surface of the plating layer may show poor appearance due to formation of deposits. Therefore, Ti: 0.10% or less and B: 0.05% or less are preferably used when these elements are added.

Inclusion of Si in a hot-dipping bath can prevent excessive growth of an Fe—Al alloy layer generated at the interface between the original surface of the plated sheet and the plating layer. This is advantageous for improving the processability of a hot-dipped Zn—Al—Mg based plated steel sheet. Therefore, Si may be contained, as necessary. In that case, an Si content of 0.005% or more is more effective. However, an excessive content of Si may be a factor for increasing the amount of dross in a hot-dipping bath. Therefore, the content of Si is preferably 2.0% or less.

A hot-dipping bath may be easily contaminated by Fe because a steel sheet is immersed into and passed through the bath. The content of Fe in a Zn—Al—Mg based plating layer is preferably 2.5% or less.

There is no particular limitation for the plating deposition amount and the sheet thickness of the Zn-based plated steel sheet used in the present invention. The plating deposition amount per side is preferably 20 to 250 g/m². A small plating deposition amount is disadvantageous for maintaining corrosion resistance and sacrificial protection effects of a plated side for a long period of time. On the other hand, an increased plating deposition amount tends to increase a gas yield, resulting in promoted development of blowholes during welding. Therefore, the plating deposition amount per side is preferably 20 g/m² or more and 250 g/m² or less.

Depending on uses, various steel types can be used for the Zn-based plated steel sheets used in the present invention. A high-tensile steel sheet can also be used. The sheet thickness of a steel sheet can be 1.6 to 6.0 mm.

For the welded joint produced by the arc welding method according to the present invention, the blowhole occupancy over the entire welding length is preferably less than 30%. Good effects can be obtained in view of the welding strength and appearance.

The present invention is preferably applied to the fillet arc welding method, and the gas shielded arc welding such as the MAG method and the MIG method can be used. With regard to welded joints, the present invention can be applied to lap joints where multiple sheet members are partly overlaid, T-shaped joints where an end surface of one sheet member is placed on a surface of the other sheet member in a substantially perpendicular manner, crucially-shaped cruciform joints, corner joints where base materials are maintained in a substantially right-angled L-shape, and the like.

EXAMPLES

Below, the present invention will be described in more detail based on Examples, but the present invention shall not be limited to these descriptions.

Test Example 1

Figure 1A:
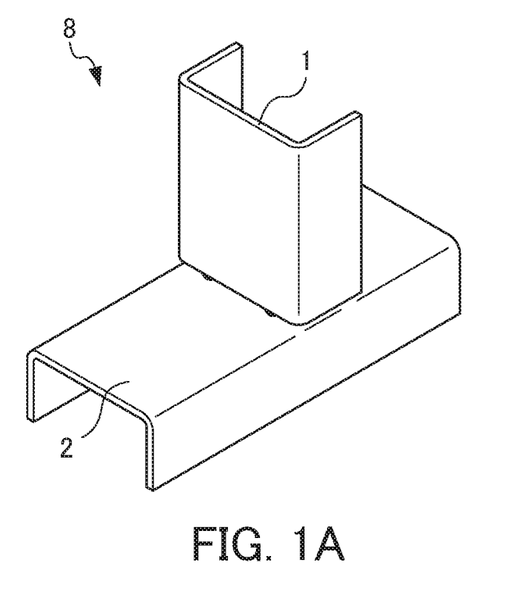
FIG. 1(a) is a perspective view and FIG. 1(b) is a front view.

A groove-shaped steel (30 mm×60 mm) made of a Zn—Al—Mg based plated steel sheet with a sheet thickness of 2.3 mm was used to prepare welding members 1 and 2 as shown in FIG. 1(a). The Zn—Al—Mg based plated steel sheet used here has a hot-dipped layer in a deposition amount of 90 g/m², the hot-dipped layer having a composition consisting of, by mass %, Al 6.2%, Mg 2.9%, Ti 0.05%, B 0.01%, Si 0.02%, Fe 0.8%, and the remainder being Zn.

Figure 1B:
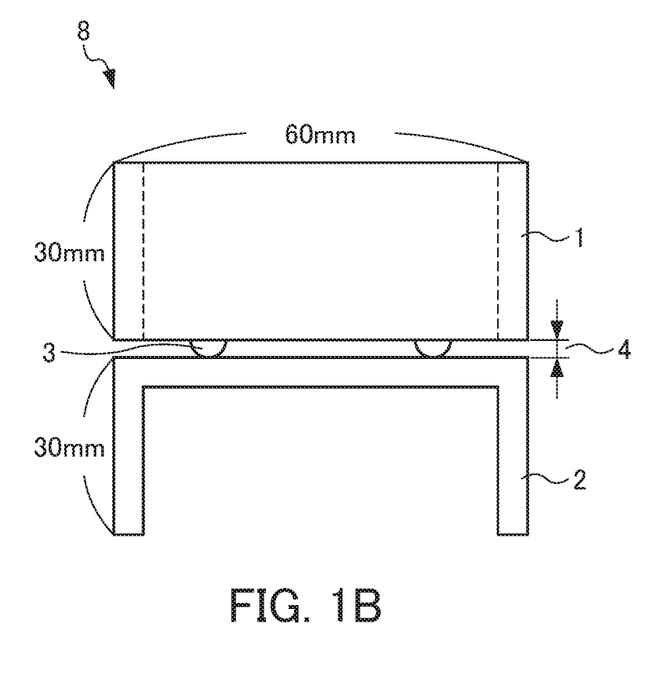

As shown in FIG. 1(b), two protrusions 3 were provided on an edge portion of a first welding member 1 by partially press-compressing and projecting a side which is to abut on the second welding member 2 in the direction of the sheet thickness using a pressing device for making protrusions. The first welding member 1 was placed on a planar portion of the second welding member 2 such that they were assembled in a T-shape to obtain an assembly body 8. The welding members 1 and 2, which were brought into contact with each other through the protrusions 3, had a gap corresponding to the height of the protrusions. Then, this assembly body was subjected to $CO_2$ shielded arc welding to produce a T-shaped joint. The dimension of the above T-shaped assembly body 8 is shown in FIG. 1(b). The protrusions 3 were each provided at a position of 10 mm from the corresponding end of the welding member 1. The height of a protrusion can be increased by increasing the rate (compression rate) of press-compression using a pressing device for making protrusions.

Welding conditions were as follows: welding current: 160 A, arc voltage: 22.0 V, welding speed: 0.4 m/min, and torch angle: 45°, and the length of a weld bead was 52 mm. Carbon dioxide gas as a shielding gas was supplied at a flow rate of 20 l/min. A commercially available product (MG-50T, Kobe Steel Ltd.) with a diameter of 1.2 mm corresponding to YGW12 of JIS Z3212 was used as a weld wire. Welding was started at one end of the overlaid portion, and the welding wire was moved toward the other end in one direction to perform welding.

(Measuring and Evaluating Blowhole Occupancy)

In order to investigate the effect of the inter-sheet gap, assembly bodies with a protrusion height of 0.5 mm, 0.7 mm, 1 mm, 1.2 mm, and 1.5 mm were produced. For the same protrusion height, 3 test pieces (n=3) were prepared. Further, 3 test pieces (n=3) for a T-shaped joint without having a protrusion were also prepared. These test pieces were arc-welded under the welding conditions as described above to produce T-shaped joint test pieces. Then, the blowhole occupancies in these T-shaped joints were measured and evaluated. An X-ray transmission image taken through the surface of a welding section was observed, and the blowhole occupancy (%) was computed by the following formula 1. It is noted that the length of a pit is included in the length of a blowhole when computing the blowhole occupancy (%).

Figure 3A:
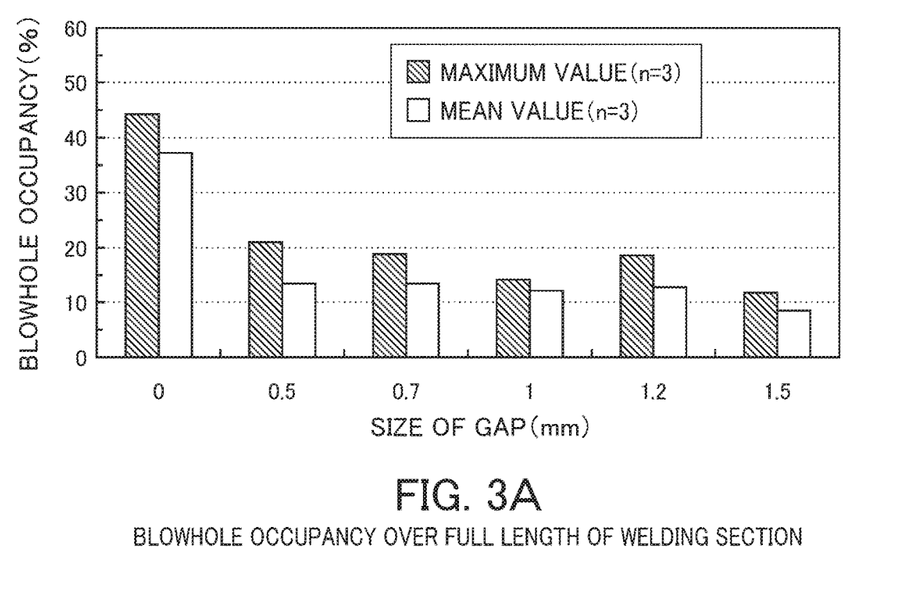
FIG. 3 shows the relationship between the inter-sheet gap and the blowhole occupancy in Example.
Figure 3B:
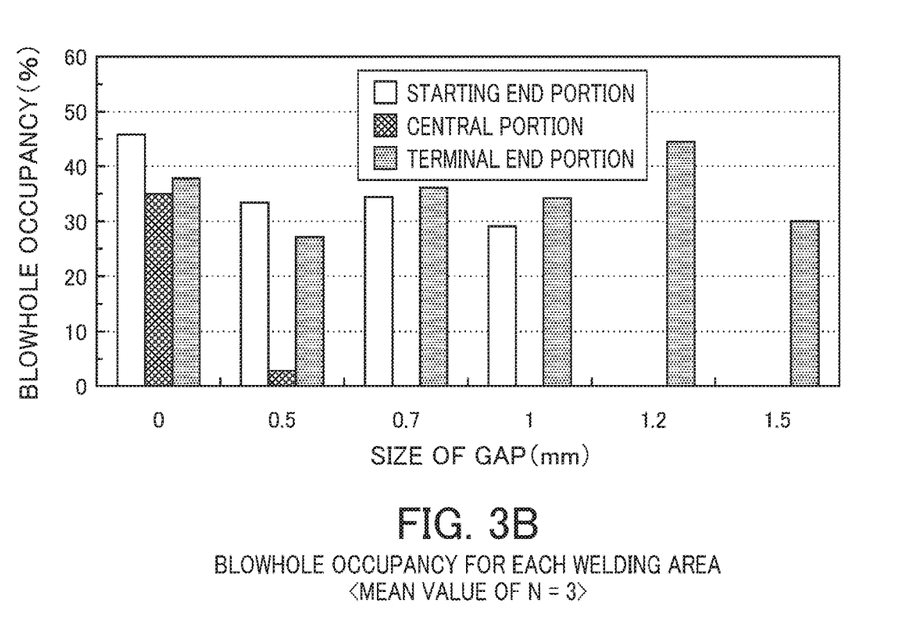

Blowhole occupancy (%)=(Total length of blowholes)/(Length of weld bead)×100        Formula 1:

Measurement results are shown in FIGS. 3(a) and 3(b). FIG. 3(a) shows the maximum and minimum values of 3 test pieces (n=3) obtained by computing the blowhole occupancies over the entire length of the welding section. Moreover, in the entire welding length of about 52 mm, regions about 10 mm in length from the corresponding end of the welding section were each designated as the starting end portion or the terminal end portion, and a region with a length of about 32 mm sandwiched between the starting end portion and the terminal end portion was designated as the central portion. The blowhole occupancy in each region was measured, and the mean values computed for each region of the starting end portion, the central portion, and the terminal end portion are shown in FIG. 3(b).

As shown in FIG. 3(a), the test pieces with no protrusion (the gas size was 0 mm) showed a blowhole occupancy of more than 30%. In contrast, the test pieces with protrusions showed a mean value of blowhole occupancies of 15% or less, and 10% or less when the gap size was 1.5 mm, yielding good welding structures.

However, when each region of the welding section is examined for each welding area, almost no blowhole is developed in the central portion while the blowhole occupancies in the starting end portion or the terminal end portion are more than 30% for some occasions as shown in FIG. 3(b). No blowhole is developed in the starting end portion when the size of the gap is 1.2 mm or more. In contrast, blowholes are developed in the terminal end portion regardless of the size of the gap. As described above, even if the mean value for the entire length of a weld bead is low, blowholes may tend to be developed in the starting end portion and the terminal end portion unlike in the central portion.

Figure 4:
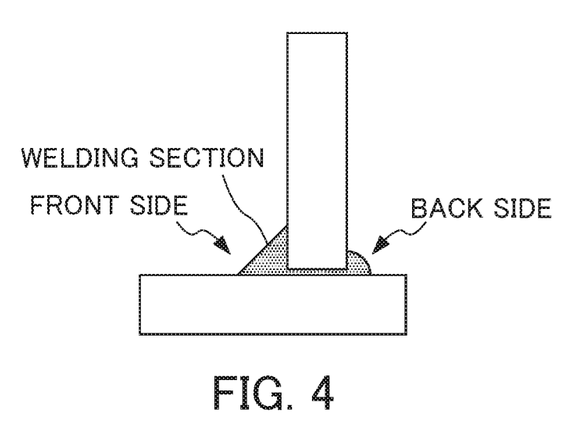
FIG. 4 schematically shows a back-side bead formed at the back side of the welding section.

Further, when the size of a gap is large, for example, 1.5 mm, the mean value of blowhole occupancies is decreased to 10% or less as shown in FIG. 3(a). Meanwhile, as shown in FIG. 4, a part of the weld bead formed in the front side of the welding section passes through the gap to reach the back side, and forms a back bead. In particular when the size of the gap is more than 1.2 mm, the back bead is significantly formed. Accordingly the amount of the bead in the front side is decreased, resulting in a thin bead. This may impair the welding strength and appearance. As described above, increasing the size of a gap alone cannot sufficiently reduce development of blowholes. Conditions suitable for reducing development of blowholes in the starting end portion and the terminal end portion need to be found.

Test Example 2

Even though an inter-sheet gap is provided, as the cooling speed is fast, a melted metal appears to solidify before a generated gas is discharged from a weld metal, resulting in development of blowholes in the starting end portion and the terminal end portion. Therefore, welding conditions were studied for reducing development of blowholes by extending a melting time of a weld metal in the starting end portion and the terminal end portion in order to secure a time for a gas to be discharged.

T-shaped assembly bodies with an inter-sheet gap of 1 mm were prepared according to a similar procedure as used in Test Example 1. Then, arc welding was performed with varied welding conditions to produce T-shaped joint test pieces.

As shown in FIG. 2(a), welding was performed by moving a welding means in one direction. Welding was started at a position (weld starting point) which was about 4 mm away from one end of a portion where welding members 1 and 2 abut each other. Welding was performed by allowing a weld wire to move toward the other end in one direction. After reaching the vicinity of the welding end point at the other end, the movement of the weld wire was stopped, but welding was continued for a predetermined period of time at a position where the weld wire was stopped. Then welding was terminated. The starting end of the welding section corresponds to the welding start point, and the terminal end of the welding section corresponds to the welding end point. The starting end portion and the terminal end portion are each a region with a length of about 10 mm from the corresponding end of the welding section, and the central portion sandwiched between the starting end portion and the terminal end portion is a region with a length of about 32 mm.

In the first step of forming the starting end portion, welding was performed at a speed slower than the welding speed in the second step of forming the central portion. In the third step of forming the terminal end portion, welding was performed under conditions where the welding current, the welding voltage, and the welding speed were smaller than those in the second step. The resulting T-shaped joint test pieces were measured for blowhole occupancies. Welding conditions and measurement results are shown in Table 1.

TABLE 1

| | Welding area | | | | | | | | | | | | | | | |
|---|---|---|---|---|---|---|---|---|---|---|---|---|---|---|---|---|
| | Starting end portion | | | | | Central portion | | | | | Terminal end portion | | | | | Full length |
| Welding condition | Current (A) | Voltage (V) | Speed (m/min) | Heat input (J/cm) | Blowhole occupancy (%) | Current (A) | Voltage (V) | Speed (m/min) | Heat input (J/cm) | Blowhole occupancy (%) | Current (A) | Voltage (V) | Speed (m/min) | Stop time (seconds) | Blowhole occupancy (%) | Blowhole occupancy (%) |
| Present example 1 | 160 | 20.0 | 0.3 | 6400 | 18 | 160 | 22.0 | 0.4 | 5280 | 0 | 100 | 16.0 | 0 | 1.0 | 18 | 7 |
| Present example 2 | 160 | 22.0 | 0.3 | 7040 | 0 | | | | | 0 | 100 | 16.0 | 0 | 1.0 | 18 | 4 |
| Present example 3 | 160 | 22.0 | 0.25 | 8450 | 13 | | | | | 0 | 100 | 16.0 | 0 | 1.0 | 15 | 5 |
| Comparative Example 1 | 160 | 22.0 | 0.4 | 5280 | 23 | | | | | 0 | 160 | 22.0 | 0.4 | 0 | 38 | 12 |

(Note))
Heat input(J/cm) = (Welding current(A) × Voltage(V) × 60)/Welding speed(cm/min)

In Comparative Example 1, the conventional method was used in which welding was performed under the same conditions of a welded welding current, a welding voltage, and a welding speed throughout the entire welding length as shown in Table 1, and one of those test pieces with an inter-sheet gap of 1 mm from Test Example 1 as shown in FIG. 3(b) was used. The blowhole occupancy of Comparative Example 1 was not developed in the central portion as in the case of FIG. 3(b) while it showed values of 23% and 38% in the starting end portion and the terminal end portion, respectively, as shown in Table 1. Both of the values were considered to be large. Further, the blowhole occupancy over the entire length of the welding section was 12%.

In contrast, in the present examples 1 to 3, welding was performed in the starting end portion a welding speed slower than that in the central portion and with a welding heat input 1.2 times of that in the central portion. In the central portion, welding was performed under similar conditions as Comparative Example 1. In the terminal end portion, the welding current, the welding voltage, and the welding speed were smaller than those in the central portion, and welding was continued for 1.0 second at a position where the movement of a welding wire was stopped to perform crater treatment. The blowhole occupancies of the present examples 1 to 3 showed values as small as 0 to 18% in the starting end portion, as small as 15 to 18% in the terminal end portion, and as small as 7% or less in the terminal end portion. The welding conditions used in the starting end portion and the terminal end portion as described above enabled an extended solidification time of a weld metal to increase a time for a generated gas to be discharged. This reduced a proportion of the gas remaining in a melted section. Thus, the method according to the present invention was able to be demonstrated as effective for reducing development of blowholes throughout the entire length of a weld bead.

As seen from the results described above, the combination of the approach of performing welding in the starting end portion at a low speed with a high heat input and the approach of performing crater treatment in the terminal end portion was able to significantly reduce the blowhole occupancy over the entire welding length, and showed the outstanding functional effects.

Test Example 3

T-shaped assembly bodies with an inter-sheet gap of 1 mm were prepared according to a similar procedure as used in Test Example 1. Then, arc welding was performed according to a similar procedure as used in Test Example 2 to produce T-shaped joint test pieces except that the welding conditions in the first step of forming the starting end portion were changed.

As shown in FIG. 2(b), welding was performed according to the reverse welding process. A position located 10 mm inwardly away from one end of the overlaid portion to be welded was selected as the welding start point. Welding was started at the welding start point as the starting point, and welding was performed by allowing a welding wire to move toward the one end in one direction. Then, the welding wire was turned around and moved toward the other end to perform welding. As in Test Example 1, after reaching the vicinity of the welding end point, the movement of the weld wire was stopped, but welding was continued for a predetermined period of time at a position where the weld wire was stopped. Then welding was terminated. The terminal end of the welding section corresponds to the welding end point. The starting end portion and the terminal end portion are each a region with a length of about 10 mm from the corresponding end of the welding section, and the central portion sandwiched between the starting end portion and the terminal end portion is a region with a length of about 32 mm.

In the first step according to this reverse welding process, reciprocal welding was performed for the starting end portion, but after turning around at the one end, welding was performed under the same welding conditions as used in the second step of forming the central portion (the welding current: 160 A, the welding voltage: 22.0 V, the welding speed: 0.4 m/min, the welding heat input: 5280 J/cm). In the first step, the welding process toward the one end was performed at a welding speed lower than that in the welding process toward the other end after the turnaround. In the second step of forming the central portion and the third step of forming the terminal end portion, welding was performed under the same conditions as used in Test Example 2. The resulting T-shaped joint test pieces were measured for blowhole occupancies. The welding conditions and measurement results in the starting end portion are shown in Table 2.

section including the blowhole occupancies of the central portion and the terminal end portion was 6% for the present example 4, which was better than those of Comparative Examples 2 to 4. Thus, the method according to the present invention was able to be demonstrated as effective for reducing development of blowholes even when the reverse welding process is used.

EXPLANATION OF REFERENCE NUMERALS

1 First welding member
2 Second welding member
3 Protrusion
4 Inter-sheet gap
5 Starting end portion
6 Central portion
7 Terminal end portion
8 Assembly body

TABLE 2

| | Welding area | | | | | | | | | |
|---|---|---|---|---|---|---|---|---|---|---|
| | Starting end portion (Upper panel) First half (Lower panel) Second half | | | | | Central portion | | | | |
| Welding condition | Current (A) | Voltage (V) | Speed (m/min) | Heat input (J/cm) | Blowhole occupancy (%) | Current (A) | Voltage (V) | Speed (m/min) | Heat input (J/cm) | Blowhole occupancy (%) |
| Present example 4 | 135<br>160 | 18.0<br>22.0 | 0.2<br>0.4 | 7290<br>5280 | 9 | 160 | 22.0 | 0.4 | 5280 | 0 |
| Comparative Example 2 | 115<br>160 | 16.5<br>22.0 | 0.4<br>0.4 | 2850<br>5280 | 44 | | | | | 0 |
| Comparative Example 3 | 115<br>160 | 16.5<br>22.0 | 0.3<br>0.4 | 3800<br>5280 | 31 | | | | | 0 |
| Comparative Example 4 | 115<br>160 | 16.5<br>22.0 | 0.2<br>0.4 | 5700<br>5280 | 28 | | | | | 0 |

| | Welding area | | | | | Full length |
|---|---|---|---|---|---|---|
| | Terminal end portion | | | | | |
| Welding condition | Current (A) | Voltage (V) | Speed (m/min) | Stop time (seconds) | Blowhole occupancy (%) | Blowhole occupancy (%) |
| Present example 4 | 100 | 16.0 | 0 | 1.0 | 21 | 6 |
| Comparative Example 2 | 100 | 16.0 | 0 | 1.0 | 11 | 12 |
| Comparative Example 3 | 100 | 16.0 | 0 | 1.0 | 15 | 9 |
| Comparative Example 4 | 100 | 16.0 | 0 | 1.0 | 21 | 9 |

In Table 2, the "first half" represents the welding process toward the one end in the first step, and the "second half" represents the welding process toward the other end after the turnaround. As shown in Table 2, in the present example 4, welding in the first half of the first step was performed under conditions where the welding speed was slower than that in the second step, and the welding heat input was larger than that in the second step. Specifically, the welding heat input was more than 1.2 times of that of 5280 (J/cm) in the central portion. The blowhole occupancy of the starting end portion was as good as 9%. In contrast, the welding heat inputs in the first step for Comparative Examples 2 to 4 were less than 1.2 times of those in the second step, and the blowhole occupancies were as poor as 28% to 44%. Further, the blowhole occupancy over the entire length of the welding

The invention claimed is:

1. The method of arc-welding Zn-based plated steel sheets,
    in which an inter-sheet gap in a range of 0.2 to 1.5 mm is provided, and
    welding is performed by moving a welding means along an overlaid portion of the steel sheets to be welded and joined, the method comprising:
    a first step of moving the welding means at a first welding speed from a welding start point, and applying a first welding heat input to perform welding,
    a second step of, after the first step, moving the welding means at a second welding speed, and applying a second welding heat input to perform welding and a third step of, after the second step, stopping the movement of the welding means, and performing welding for 0.1 to 2 seconds at a position where the welding means is stopped and wherein the first step includes a welding section welded under conditions where the first welding speed is smaller than the second welding speed, and the first welding heat input is larger than the second welding heat input, the third step includes performing welding at a welding current and a welding voltage lower than those used in the second step, a starting end portion corresponding to a welding section after the first step is a region covering 10 to 40% of the entirety of a welding length, and a terminal end portion corresponding to a welding section after the third step is a region covering 10 to 20% of the entirety of the welding length, the first step includes performing welding at the welding start point located inwardly from one end of the overlaid portion toward the one end, followed by performing welding from the one end toward an other end of the overlaid portion, the welding toward the one end is performed at a welding speed smaller than the welding speed in the second step and with a welding heat input more than 1.2 times of the second welding heat input, and the welding toward the other end is performed at the same welding speed as the second welding speed.

2. The method of arc-welding Zn-based plated steel sheets according to claim 1, wherein a blowhole occupancy over the entirety of the welding length is less than 30%.

3. The method of arc-welding Zn-based plated steel sheets according to claim 1, wherein the Zn-based plated steel sheets each have a hot-dipped layer consisting of, by mass %, Al: 4.0 to 22.0%, Mg: 0.05 to 10.0%, Ti: 0 to 0.10%, B: 0 to 0.05%, Si: 0 to 2.0%, Fe: 0 to 2.5%, and the remainder being Zn and unavoidable impurities.

4. The arc welding method according to claim 1, wherein the Zn-based plated steel sheets each have a plating deposition amount per side of 20 to 250 g/m2, and a sheet thickness of 1.6 to 6.0 mm.

* * * * *